United States Patent [19]

Sugita et al.

[11] Patent Number: 5,212,648

[45] Date of Patent: May 18, 1993

[54] METHOD AND APPARATUS FOR MACHINING A NON-CIRCULAR WORKPIECE

[75] Inventors: Kazuhiko Sugita, Anjo; Norio Sakakibara, Kariya; Nobumitsu Hori, Ichinomiya; Yoichi Yamakawa, Aichi; Toshihiro Takahashi, Nishio, all of Japan

[73] Assignee: Toyoda Koki Kabushiki Kaisha, Kariya, Japan

[21] Appl. No.: 667,577

[22] Filed: Mar. 11, 1991

[30] Foreign Application Priority Data

Mar. 22, 1990 [JP] Japan .................................. 2-72493

[51] Int. Cl.⁵ .......................... B23B 3/28; G06F 3/14
[52] U.S. Cl. ................................ 364/474.35; 82/118; 318/561
[58] Field of Search ...................... 364/474.35, 167.01; 318/616, 568.11, 561, 618, 621; 82/118

[56] References Cited

U.S. PATENT DOCUMENTS

| | | | |
|---|---|---|---|
| 4,203,062 | 5/1980 | Bathem | 82/137 |
| 4,366,543 | 12/1982 | Felled et al. | 82/18 |
| 4,564,914 | 1/1986 | Ballough et al. | 82/18 |
| 4,646,592 | 3/1987 | Slee | 82/118 |
| 4,646,595 | 3/1987 | Elle | 82/118 |
| 4,745,832 | 5/1988 | Kurik | 82/123 |
| 4,788,482 | 11/1988 | Tachihana et al. | 318/616 |
| 4,914,370 | 4/1990 | Sakamoto et al. | 318/616 |
| 4,992,711 | 2/1991 | Sugita et al. | 318/561 |
| 5,054,340 | 10/1991 | Sugita et al. | 82/18 |
| 5,091,683 | 2/1992 | Shimada | 318/568.11 |

FOREIGN PATENT DOCUMENTS

| | | |
|---|---|---|
| 0269878 | 6/1988 | European Pat. Off. |
| 2515907 | 10/1975 | Fed. Rep. of Germany |
| 0190544 | 8/1986 | Fed. Rep. of Germany .......... 82/18 |

OTHER PUBLICATIONS

Patent Abstracts of Japan, vol. 9, No. 25 (M-355) (1748) Feb. 2, 1985, & JP-A-59 169753 (Toshiba K.K.) Sep. 25, 1984.

Primary Examiner—Jerry Smith
Assistant Examiner—Jim Trammell
Attorney, Agent, or Firm—Oblon, Spivak, McClelland, Maier & Neustadt

[57] ABSTRACT

An apparatus for machining a non-circular workpiece wherein a tool is moved by a composite movement given by a linear motor and a piezoelectric actuator. The linear motor is driven by the numerical controller in accordance with the low frequency components of profile data defining a position change of the tool with respect to angular position change of the spindle, while the piezoelectric actuator is driven by the numerical controller in accordance with the high frequency components of the profile data. Further, a positioning error of the tool due to reaction force generated by the piezoelectric actuator is detected by the numerical controller to compensate the high frequency components for the detected positioning error.

9 Claims, 12 Drawing Sheets

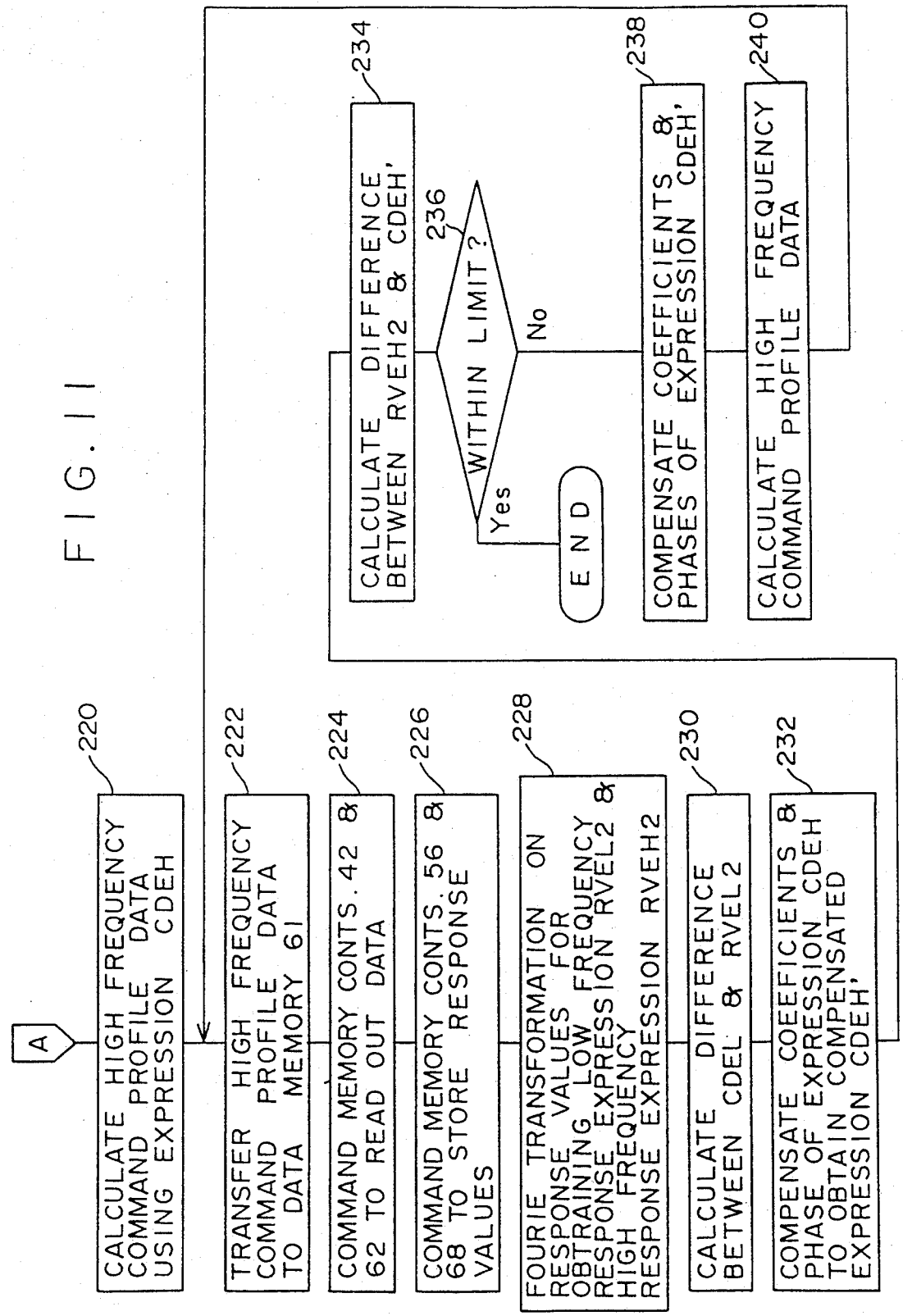

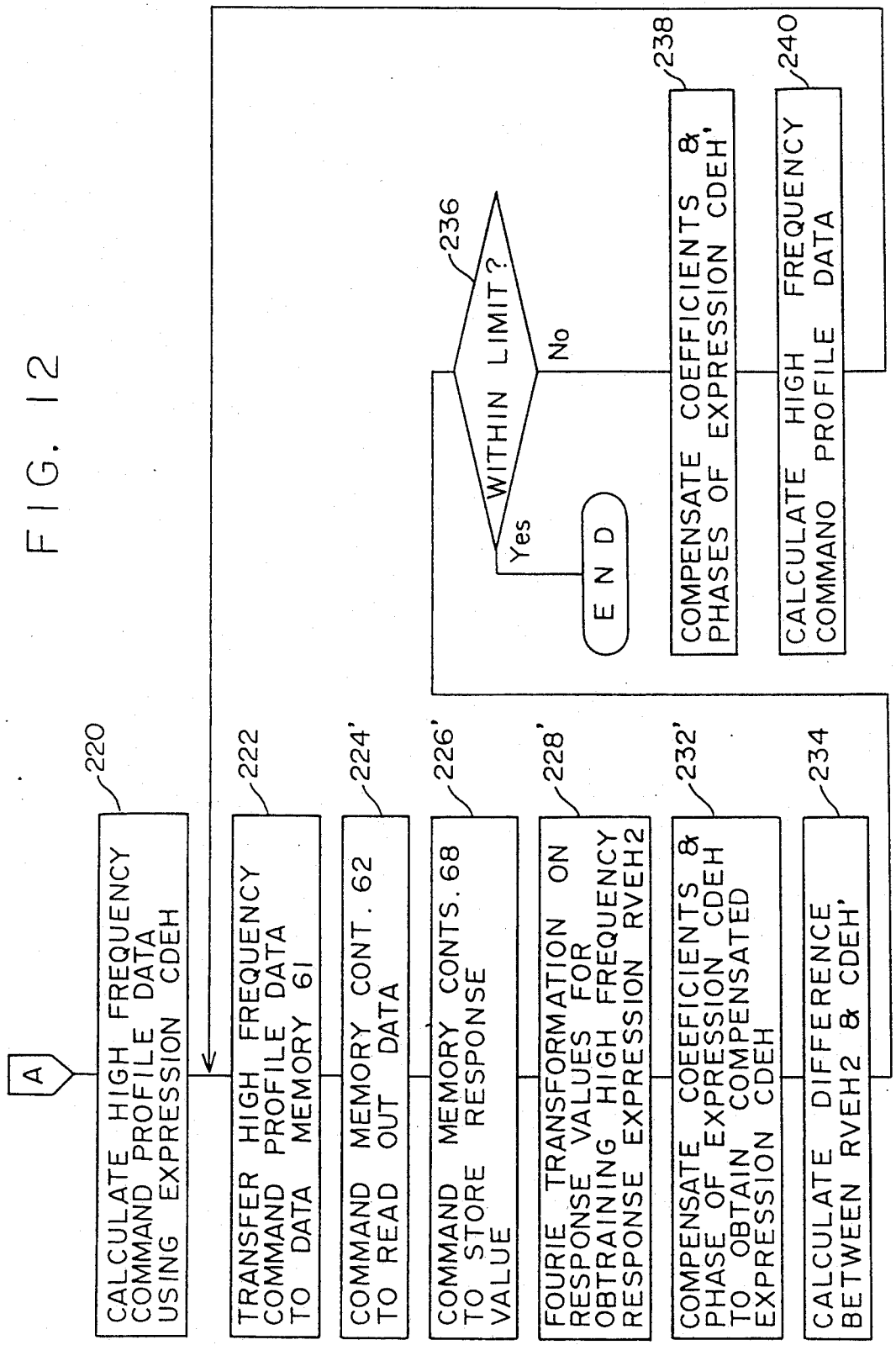

METHOD AND APPARATUS FOR MACHINING A NON-CIRCULAR WORKPIECE

BACKGROUND OF THE INVENTION

1. Field of the Invention

The present invention relates to a method and an apparatus for machining a non-circular workpiece, wherein a cutting tool is moved by a low speed actuator and a high speed actuator.

2. Discussion of the Prior Art

An apparatus of this kind is disclosed in the U.S patent application Ser. No. 07/471,392, which was filed on Jan. 29, 1990 U.S. Pat. No. 5,054,340 by the assignee of this application. In the apparatus, a cutting tool is moved in a moving direction perpendicular to the rotational axis of a workpiece by a piezoelectric actuator and a linear motor which are disposed in series in the moving direction of the tool. Namely, the linear motor is disposed on a base for moving a movable member which supports the cutting tool at its forward end, while the piezoelectric actuator is disposed at the forward end of the movable member to move the pool with respect to the movable member. Profile data defining a position change of the tool with respect to angular position change of the workpieces is decomposed by Fourier transformation into low frequency components and high frequency components so as to drive the piezoelectric actuator and linear motor, respectively. Since the piezoelectric actuator and linear motor are disposed in series in the moving direction of the tool, the tool is moved by a composite movement produced by the piezoelectric actuator and linear motor.

However, the apparatus has a problem that reaction force produced by the piezoelectric actuator deteriorates machining accuracy. Although the tool holder is designed to be light, the reaction force generated by the piezoelectric actuator becomes relatively large when the piezoelectric actuator is driven by a high-frequency drive signal. This reaction force is transmitted to the linear motor, as disturbance, thereby affecting the moving accuracy of the tool. Therefore, in the prior apparatus, it is difficult to improve the machining accuracy.

SUMMARY OF THE INVENTION

Accordingly, it is an object of the present invention is to provide an improved method for machining a non-circular workpiece wherein a positioning error due to reaction force produced by a high speed actuator is compensated, thereby realizing high accurate machining.

Other object of the present invention is to provide an improved apparatus capable of accurately machining a non-circular workpiece regardless of reaction force produced by a high speed actuator.

Further object of the present invention is to provide a apparatus for machining a non-circular workpiece capable of compensating for a positioning error, which occurs due to reaction force produced by a high speed actuator.

Briefly, a method according to the present invention is used in a machine tool which is provided with a spindle to which a workpiece is attached, a movable member being guided on a base for movement in a moving direction perpendicular to the rotational axis of the spindle, a tool being supported at a front end of the movable member for movement in the moving direction, a low speed actuator for moving the movable member in the moving direction with respect to the base, a high speed actuator for moving the tool in the moving direction with respect to the movable member, first command means for generating low frequency command data indicating low frequency components of profile data defining a position change of the tool with respect to angular position change of the spindle, first drive means for driving the low speed actuator in accordance with the low frequency command data, second command means for generating high frequency command data indicating high frequency components of the profile data, and second drive means for driving the high speed actuator in accordance with the high frequency command data. The method comprising a step for detecting a positioning error of the tool which is produced due to reaction force produced by the high speed actuator and a step for compensating the high frequency command data based on the detected positioning error, and a step for activating the first and second drive means for machining the workpiece using the low frequency command data and the compensated high frequency command data. Accordingly, the workpiece can be machined into a desired non-circular shape with a high accuracy regardless of reaction force produced by the high speed actuator.

Also, an apparatus according to the present invention is provided with a structure which accomplishes the above-mentioned method.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

Figure 1:
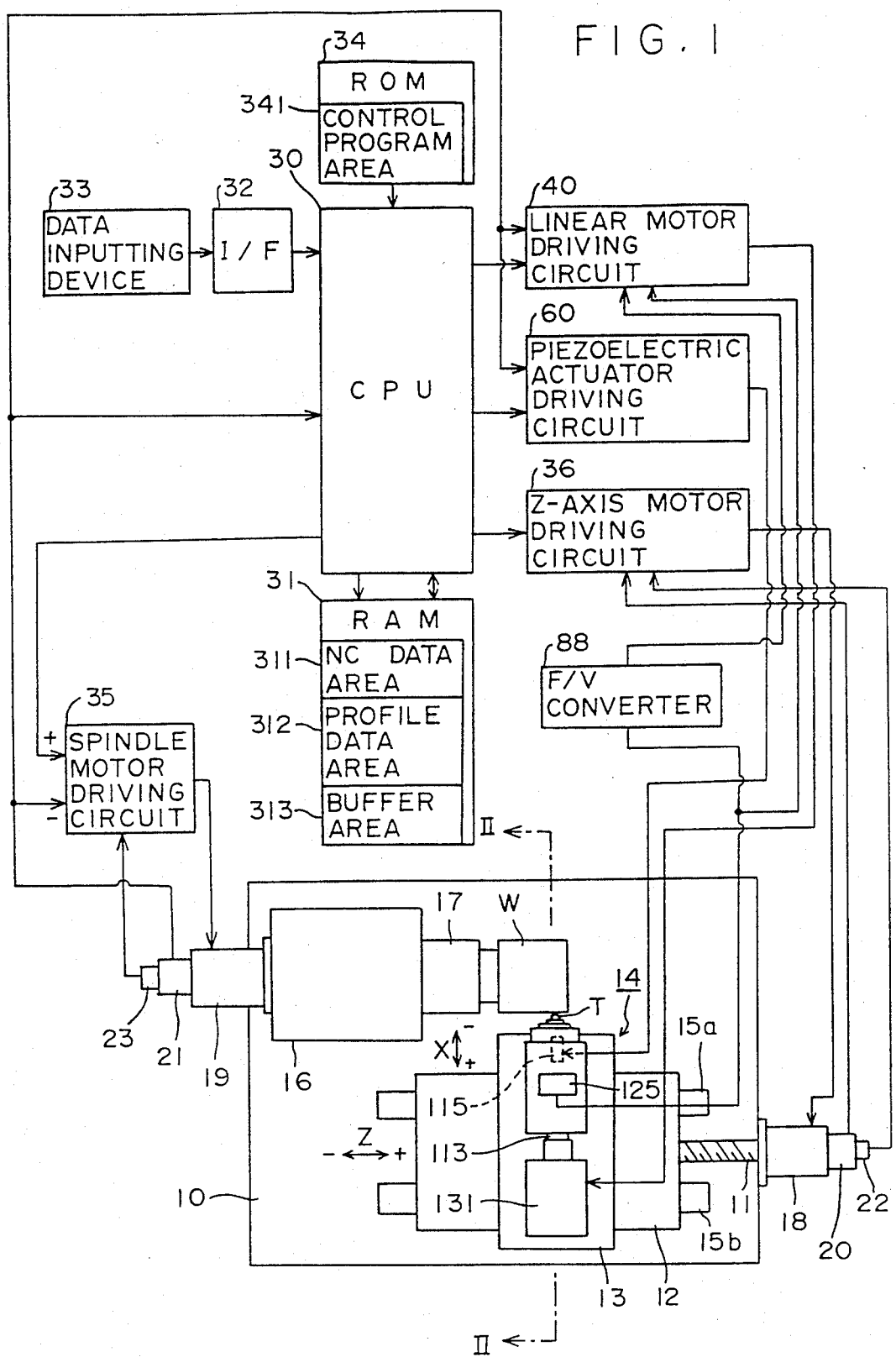
FIG. 1 is a plan view of a machining apparatus according to the present invention.
Figure 8A:
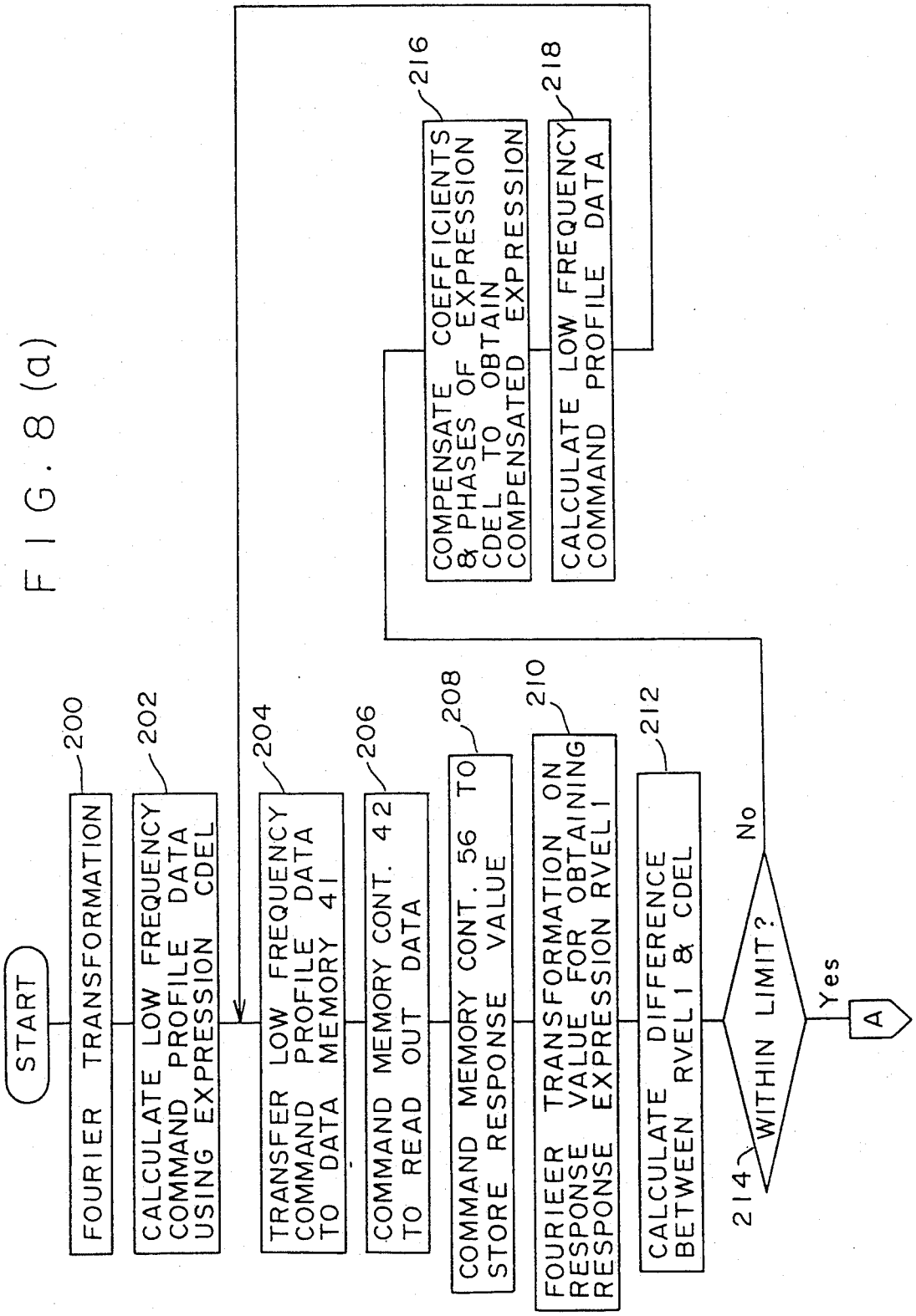
Figure 8B:
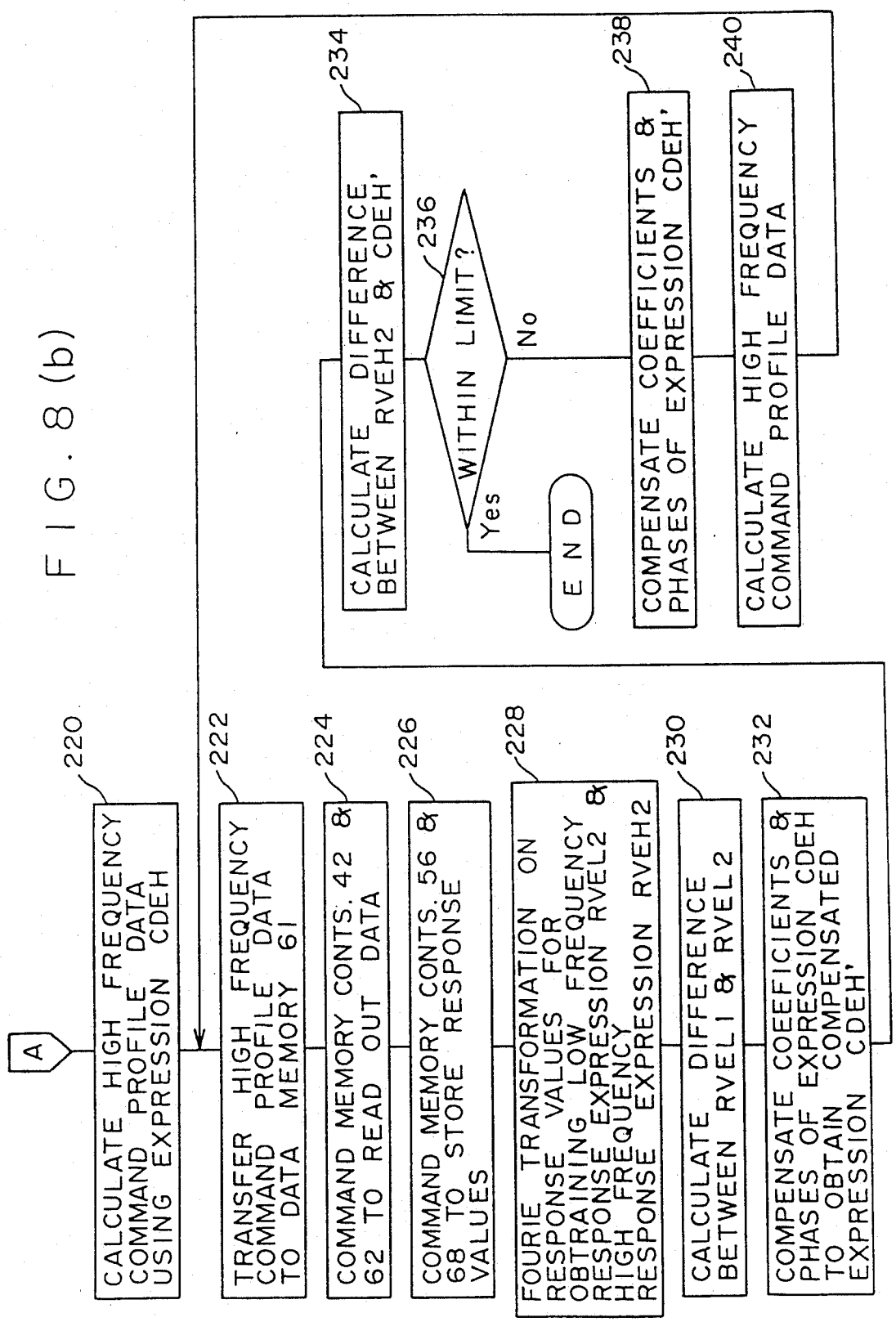
Figure 10:
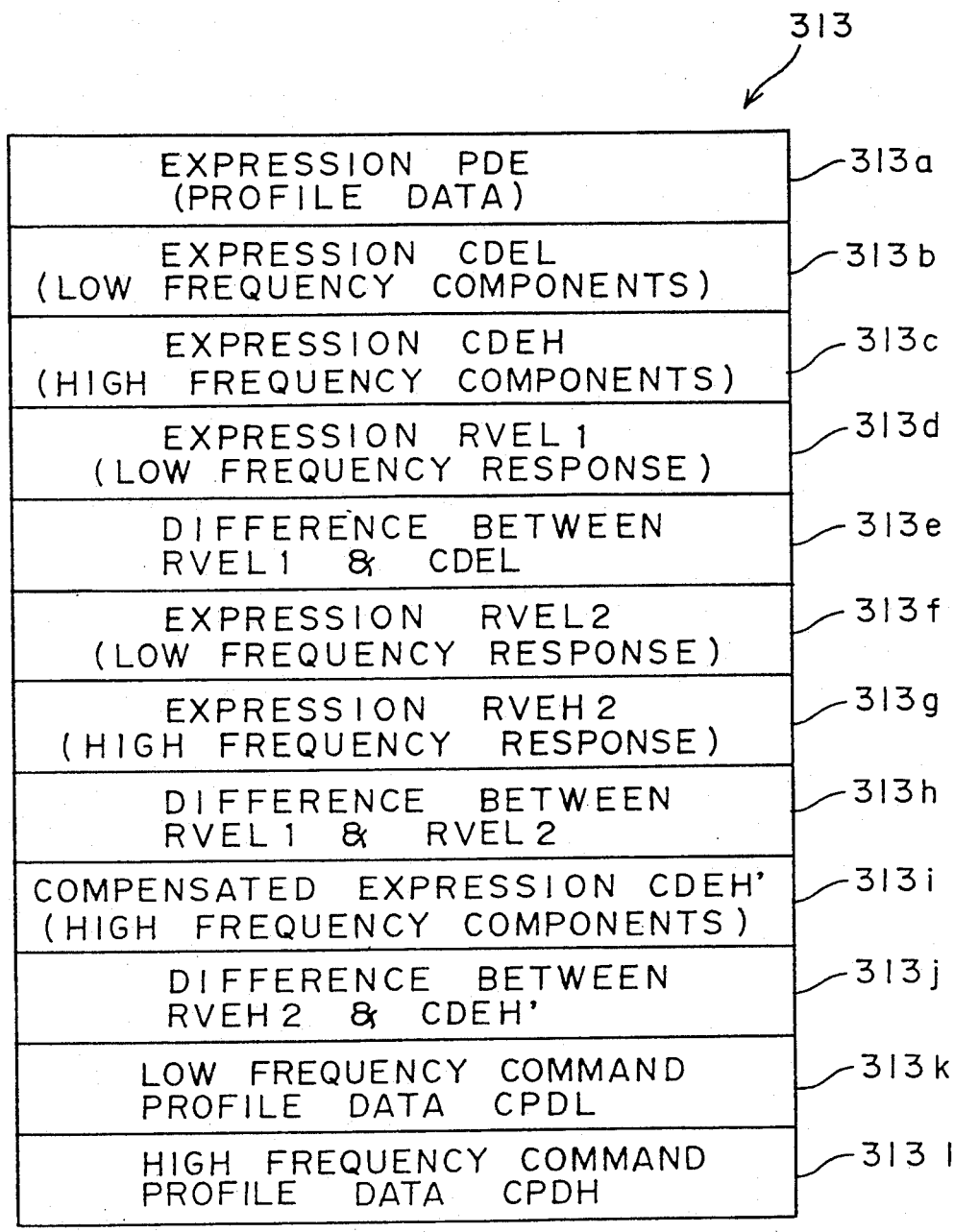

FIGS. 8 (a) through 9 are flow charts showing the processing of the CPU shown in FIG. 1;

FIG. 10 is an explanatory chart showing the buffer area of the RAM shown in FIG. 1;

FIG. 11 is a flow chart showing a modified embodiment according to the present invention; and FIG. 12 is a flow chart showing another modified embodiment according to the present invention.

DETAILED DESCRIPTION OF THE PREFERRED EMBODIMENT

Referring now to the drawings and particularly, to FIG. 1 thereof, there is shown a mechanical construction of a non-circular workpiece machining apparatus according to a preferred embodiment of the present invention. The apparatus includes a bed 10 and a pair of slide rails 15a and 15b disposed on the bed 10 and extending in the direction of a Z-axis. A tool slide 12 is disposed on the slide rails 15a and 15b for sliding movement in the Z-axis direction and connected to a servomotor 18 through a feed screw mechanism 11. A tool base 13 is placed on the tool slide 12, and a tool feed mechanism 14 is placed on the tool based 13 to move a cutting tool T back and forth in the X-axis direction. A rotational amount of the Z-axis servomotor 18 is detected by a rotary encoder 20, and a detection signal of the rotary encoder 20 is fed back as a position feed back signal to a Z-axis motor driving circuit 36. Meanwhile, a rotational speed of the Z-axis servomotor 18 is detected by a tachometer generator 22, and a detection signal of the tachometer generator 22 is fed back as a speed feedback signal to the Z-axis motor driving circuit 36.

A spindle head 16 is disposed on the bed 10, and a spindle 17 is supported on the spindle head 16 for rotation about a rotational axis perpendicular to the X-axis direction. The spindle 17 is connected to be rotated by a spindle servomotor 19. A workpiece W such as a piston for an engine is attached to the spindle 17 by a chuck not shown in such a way that the rotational phase of the workpiece W coincides with the rotational phase of the spindle 17. A rotational amount of the spindle servomotor 19 is detected by a rotary encoder 21, and a detection signal of the rotary encoder 21 is fed back as a position feedback signal to a spindle motor driving circuit 35. Meanwhile, a rotational speed of the spindle servomotor 19 is detected by a tachometer generator 23, and a detection signal of the tachometer generator 23 is fed back as a speed feedback signal to the spindle motor driving circuit 35.

With the apparatus, when the spindle 17 is rotated, the cutting tool T is moved back and forth in the X-axis direction in a synchronous relationship with rotation of the spindle 17 so that the workpiece W is machined so as to have a predetermined substantially elliptic cross section. The tool slide 12 is also moved in the Z-axis direction by the Z-axis servomotor 18 so that the workpiece W is machined in a desired cylindrical shape.

Figure 2:
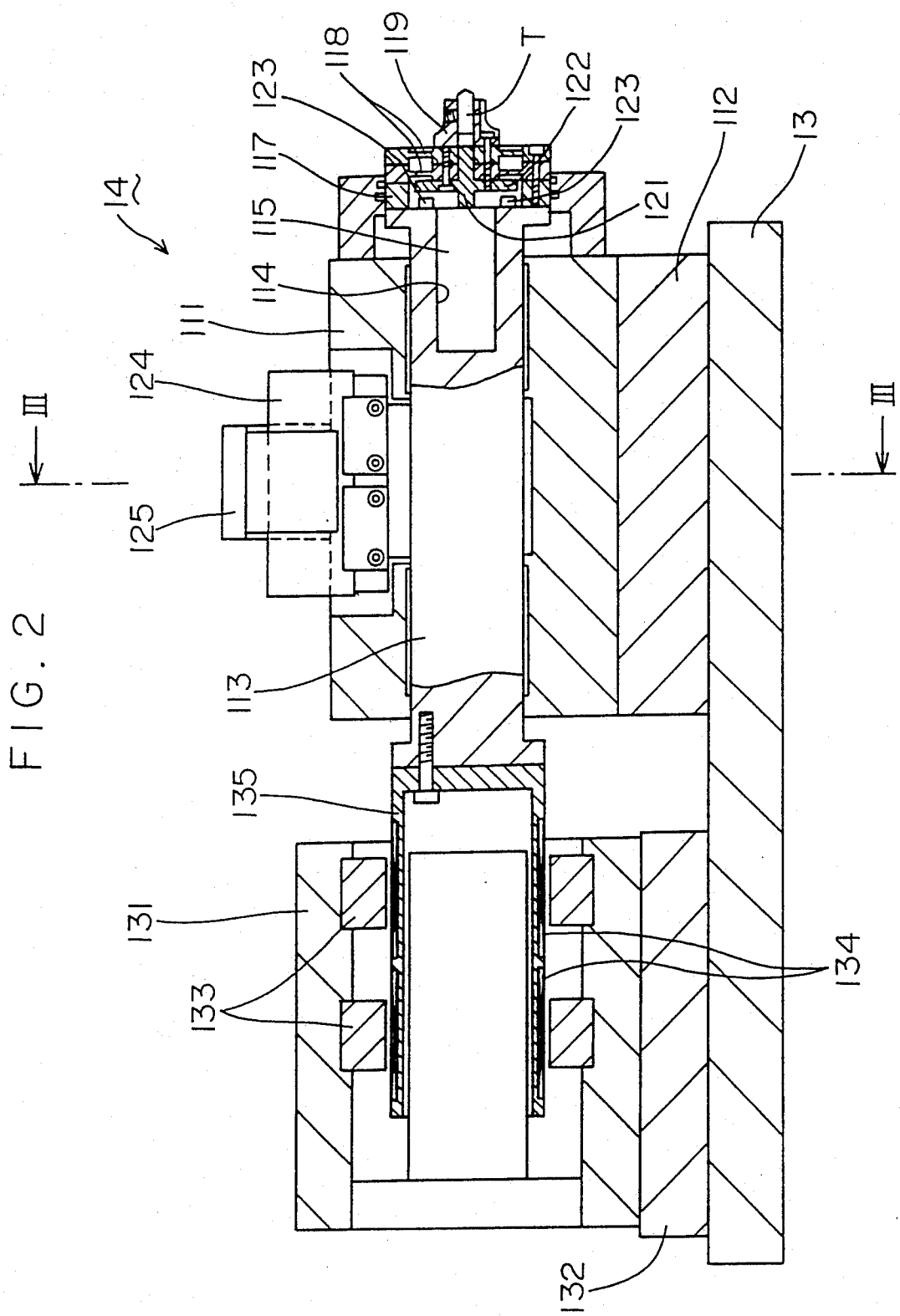
FIG. 2 is an enlarged sectional view taken along line II—II of FIG. 1.
Figure 3:
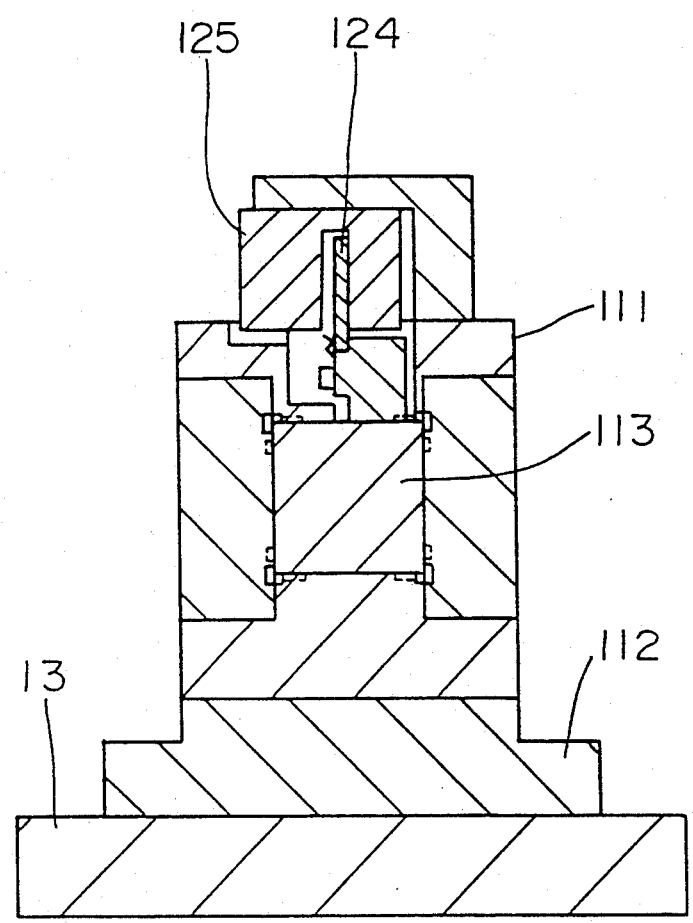
FIG. 3 is a sectional view taken along line III—III of FIG. 2.

The X-axis tool feeding mechanism 14 is shown in detail in FIGS. 2 and 3. A pair of fixed members 112 and 132 are serially arranged in the X-axis direction on the tool table 13. The fixed member 112 supports a hydrostatic bearing unit 111, while the fixed member 132 supports a linear motor 131 such as a voice coil motor (hereinafter referred to as CVM), as a low speed actuator. A rum 113 having a rectangular cross section is received by the bearing unit 111 for movement in the X-axis direction, and a piezoelectric actuator 115 is disposed, as a high speed actuator, in a cylindrical hole 114 formed at the forward end of the rum 113. Further, a pair of diaphragm springs 118 are attached through a spacer 117 to the front end surface of the rum 113 so as to support a tool holder 119 to which a tool T is attached. Meanwhile, a pushing member 121 is disposed between the piezoelectric actuator 115 and the pair of diaphragm springs 118 to transmit a force from the piezoelectric actuator 115 to the tool holder 119 through the diaphragms 118. With the construction mentioned above, the tool T is moved forward in the X-axis direction by a force produced by the high speed actuator 115. The diaphragms 118 produces a force to move the tool 120 back to its original position. Numeral 123 indicates a displacement sensor for detecting a movement of the tool T caused by the piezoelectric actuator 115. Also, a linear scale 124 is attached to the rum 13 while a reading head 125 is attached to the bearing unit 111 to detect displacement of the rum 113. The reading head 125 constitutes a linear encoder together with the linear scale 124.

The linear motor 131 fixedly attached on the fixed member 132 is composed of a pair of stator magnets 133, and a moving element 135 around which a moving coil 134 is wound. The moving element 135 is connected to the rear end of the rum 113.

Figure 4:
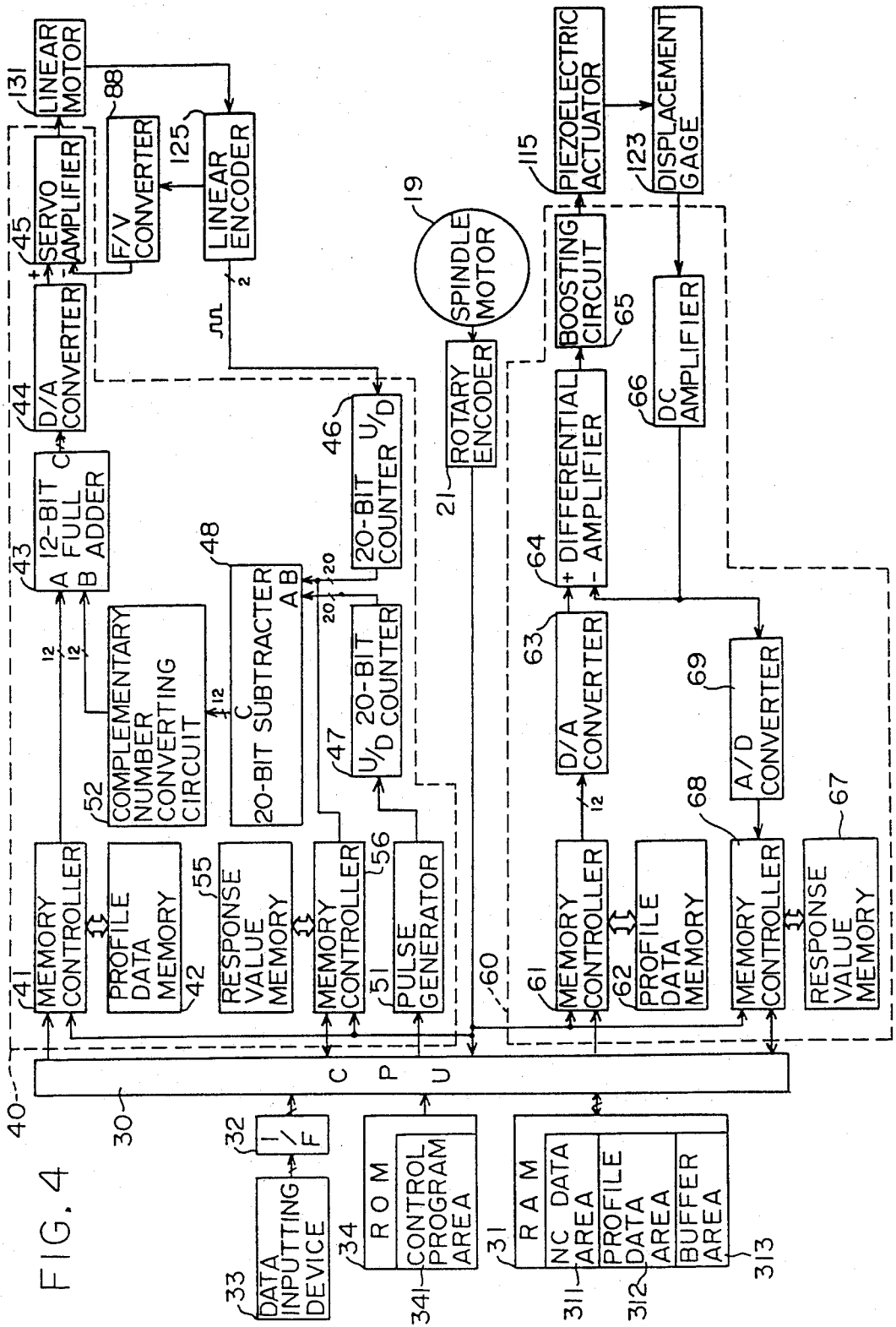
FIG. 4 is a block diagram showing detailed electrical construction of the machining apparatus shown in FIG. 1.

Referring now to FIGS. 1 and 4, an electric construction of the machining apparatus is shown. The apparatus includes a central processing unit (hereinafter referred to as "CPU") 30, a ROM 34 and a RAM 31 both directly connected to the CPU 30, and a data inputting device 33 connected to the CPU 30 though an interface circuit 32. The ROM 34 has formed therein a control program area 341 in which a control program is stored in advance while the RAM 31 has formed therein a NC data area 311 for storing NC data which define an infeed amount, an infeed speed and so forth of the tool T, and a profile data area 312 for storing therein profile data for moving the tool T back and forth in a synchronized relationship with rotation of the spindle 17. These NC data and profile data are inputted in the respective areas 311 and 312 of the RAM 31 through the data inputting device 33. The RAM has also formed therein a buffer area 313 for storing various data as described later.

Figure 5:
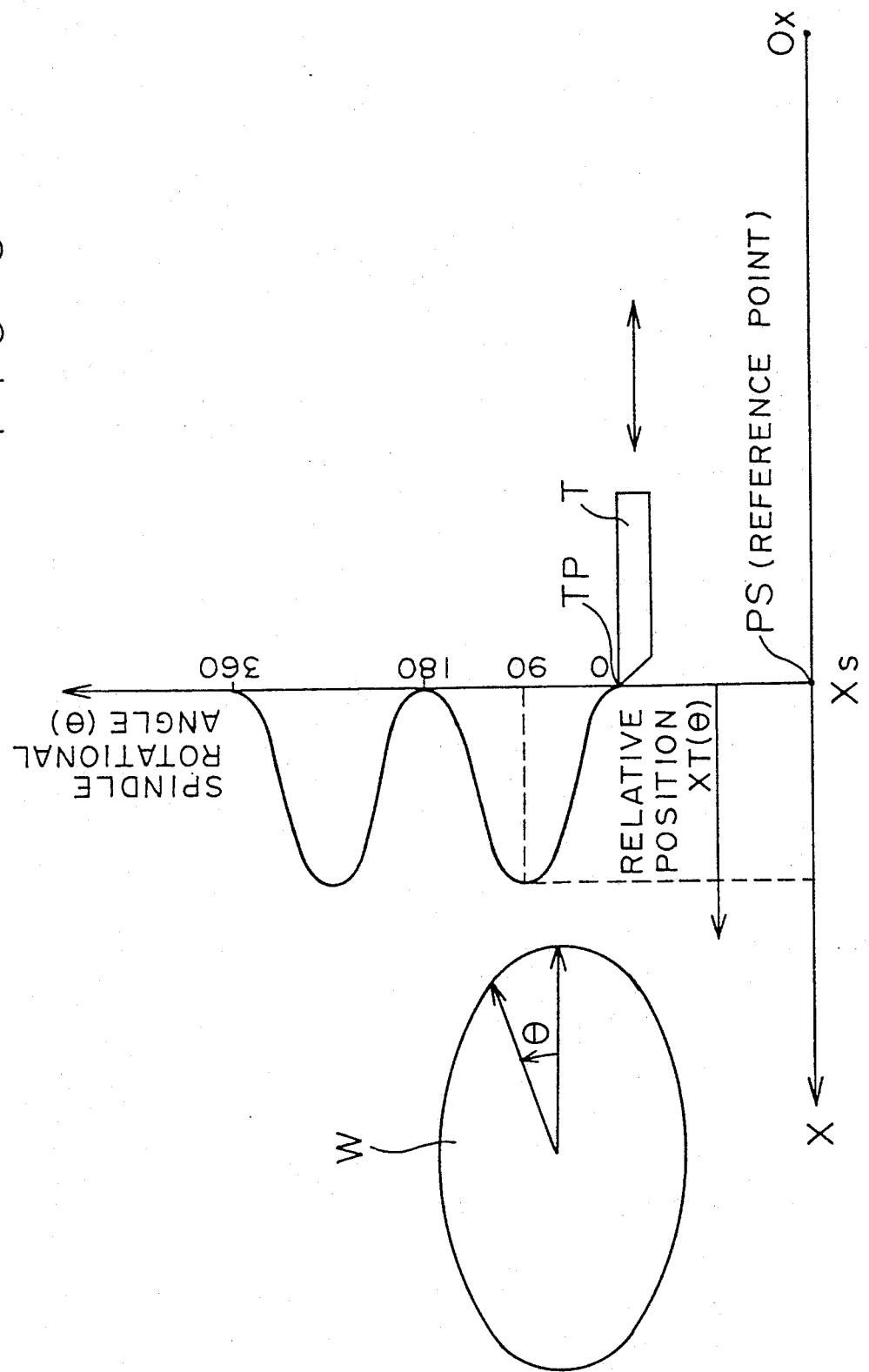
FIG. 5 is an explanatory chart showing a position change of the tool with respect to angular position change of the spindle.

As shown in FIG. 5, the profile data indicates a profile generating movement of the tool T, i.e., an X-axis position XT of the front end TP of the tool T, which varies in a synchronized relationship with angular position change of the spindle 17 with respect to a predetermined reference position Xs.

Also connected to the CPU are a linear motor driving circuit 40 for driving the linear motor 131, a piezoelectric actuator driving circuit 60 for driving the piezoelectric actuator 115, a Z-axis motor driving circuit 36 for driving the Z-axis servomotor 18, and a spindle motor driving circuit 35 for driving the spindle servomotor 19.

As will be explained later, the profile data stored in the RAM 31 is decomposed into low frequency components and high frequency components. The low frequency component of the profile data is outputted to the linear motor driving circuit 40, as low frequency command profile data CPDL, and the high frequency component of the profile data is outputted to the piezoelectric actuator driving circuit 60, as high frequency command profile data CPDH.

Referring particularly to FIG. 4, a detailed construction of the linear motor driving circuit 40 and the piezoelectric actuator driving circuit 60 is shown. The driving circuit 40 includes a memory controller 41 connected to the CPU 30 for controlling address designation and data to be inputted to or outputted from a profile data memory 42. In the write-in mode, the above-mentioned low frequency command profile data CPDL are transferred from the buffer area 313 of the RAM 31 to the profile data memory 42 by the CPU 30. Meanwhile, the memory controller 41 receives a synchronization signal which is generated by the rotary encoder 21 each time the spindle 17 is rotated by a predetermined unit angle. In the read-out mode, the count value of a built-in address counter of the memory controller 41 is updated each time the spindle 17 is rotated over the unit angle (for example, 0.5 degrees). Each time the count value of the address counter is updated, a component of profile data stored at a corresponding address of the profile data memory 42, that is, at an address corresponding to a current angular position of the spindle 17, is outputted as a parallel signal of 12 bits to a terminal A of a full adder 43 through the memory controller 41.

The linear motor driving circuit 40 further includes a pulse generator 51. The pulse generator 51 generates X-axis pulses for varying the reference position Xs of the profile generating movement in response to an instruction from the CPU 30. For example, the position of a maximum radius of a workpiece W is selected as the reference position. Accordingly, if the workpiece W has a barrel-like shape, then the reference position makes a function of the Z-coordinate. The reference position Xs of the profile generating movement can be varied arbitrarily by the generation of the X-axis pulses.

An incremental movement pulse signal generated by the pulse generator 51 is transmitted to a 20-bit counter 47. The counter 47 increments the current count value thereof in response to input puses corresponding to movement in the positive direction of the X-axis but decrements the current count value thereof in response to input puses corresponding to movement in the negative direction of the X-axis. Output of the counter 47 is coupled to a terminal A of a 20-bit subtracter 48. Thus, an output value of the counter 47 is a 20-bit parallel signal and represents an aimed target position.

On the other hand, a feedback pulse signal from the linear encoder 125 indicating a moving amount of the rum 113 is transmitted to another 20-bit counter 46. The counter 46 increments the current count value thereof in response to input puses corresponding to movement in the positive direction of the X-axis but decrements the current count value thereof in response to input pulses corresponding to movement in the negative direction of the X-axis. Output of the 20-bit counter 46 is coupled to a terminal B of the 20-bit subtracter 48. An output value of the 20-bit counter 46 is a 20-bit parallel signal representing a current position of the rum 113.

Accordingly, a deviation between the aimed target position and the current position of the rum 113 is calculated by the 20-bit subtracter 48 and is transmitted to a complementary number converting circuit 52 which has a function of inverting each bit of a received signal and adding "1" to the value after such inversion. Output of the complementary number converting circuit 53 is coupled to a terminal B of the full adder 43. Accordingly, a value obtained by subtracting an output of the subtracter 48 from a value received at the terminal A is outputted from the full adder 43. Namely, the complementary number converting circuit 53 and the full adder 43 operates as a subtracter. Output of the full adder 43 is converted into a voltage value by a digital to analog (D/A) converter 44 and transmitted to a servo amplifier 45. The servo amplifier 45 amplifies a deviation between a voltage value received from the D/A converter 44 and an output voltage of the F/V converter 88, and the linear motor 131 is driven at a speed corresponding to an output of the servo amplifier 45. Since the full adder 43 is concluded in a position feedback loop, the linear motor 131 is positioned to such a position that the output of the full adder 43 becomes zero.

In a rapid feed operation, a command signal is outputted from the CPU 30 to the pulse generator 51 to generate pulses at a rate corresponding to a predetermined rapid feed rate by an amount corresponding to a predetermined rapid feed amount. As a result, the tool T is advanced at a rapid feed rate from the original position to a predetermined cutting infeed start position. Thereafter, the memory controller 41 is set in the read-out mode by the CPU 30 to sequentially read out components of the low frequency command profile data CPDL stored in the profile data memory 42. Thus, the low frequency command profile data are outputted to the 12-bit full adder 43. Meanwhile, the CPU 30 outputs a command signal to the pulse generator 51 to generate infeed pulses at rate corresponding to a programmed infeed rate. This infeed puses are transmitted to the 20-bit counter 47. As a result, the relative position of the rum 113 with respect to the tool base 13 changes in accordance with both of the low frequency command profile data CPDL and the infeed puses generated by the pulse generator 51. Namely, the rum 113 makes a profile generating movement corresponding to the low frequency command profile data CPDL with respect to a reference position, and the reference position is gradually shifted toward the rotational axis of the spindle 17 in response to the infeed puses.

The driving circuit 40 is further provided with a response value memory 55 and a memory controller 56. The response value memory 55 is connected to the 20-bit counter 46 through the memory controller 56 to memorize output value of the counter 46, as present position of the rum 113, in a synchronized relationship with rotation of the spindle 17. The CPU 30 can read the contents of the response value memory 55 through the memory controller 56.

On the other hand, the piezoelectric actuator driving circuit 60 includes a profile data memory 62 connected to the CPU 30 through a memory controller 61. Constructions and functions of the memory controller 61 and profile data memory 62 are similar to those of the memory controller 41 and profile data memory 42 of the linear motor driving circuit 40. The profile data memory 62 has stored therein high frequency command profile data CPDH. In the read-out mode, the high frequency command profile data CPDH stored in the profile data memory 62 are sequentially read out by the memory controller 62 in a synchronized relationship with the synchronization signal from the rotary encoder 21. The read out profile data CPDH are then transmitted to a digital to analog (D/A) converter 63 through the memory controller 61 to be converted into an analog voltage value. Output of the D/A converter 63 is coupled to a differential amplifier 64.

An output of a displacement detector 123 for detecting a displacement of the tool holder 119 is amplified by a DC amplifier 66 and then transmitted to the differential amplifier 64. An output of the DC amplifier 66 represents a current relative position of the tool T with respect to the rum 113. The output of the differential amplifier 64 is boosted by a boosting circuit 65 and then applied to the piezoelectric actuator 115. Consequently, the tool T is displaced in accordance with the voltage applied to the piezoelectric actuator 115 so that the relative position of the tool end TP with respect to the rum 113 is varied. Since the differential amplifier 64 forms part of a position feedback loop, the piezoelectric actuator 115 is actuated so that the output of the differential amplifier 64 becomes zero. Accordingly, the relative position of the tool end TP with respect to the rum 113 changes in accordance with the high frequency command profile data CPDH stored in the data memory 62.

The driving circuit 60 is further provided with a response value memory 67, a memory controller 68 and an A/D converter 69. The response value memory 67 is connected to the DC amplifier 64 through the memory controller 68 and the A/D converter to memorize output value of the DC amplifier 66, as present position of the tool T, in a synchronized relationship with rotation of the spindle 17. The CPU 30 can read the contents of the response value memory 67 through the memory controller 68.

As explained above, the movement of the tool T is effected by the piezoelectric actuator 115, which is driven in accordance with the high frequency command profile data CPDH, while the movement of the rum 113 is effected by the linear motor 131, which is driven in accordance with the low frequency command profile data CPDL. Therefore, the tool T is moved by a composite movement, which is composed of the movement in accordance with the high frequency command profile data CPDH and the movement in accordance with the low frequency command profile data CPDL, to make a desired profile generating movement. At the same time, the tool T is gradually advanced in accordance with the infeed pulses generated by the pulse generator 51 in response to an infeed command in the NC program.

The operation of the CPU 30 is described hereinafter with reference to the FIGS. 8 (a) through 10.

Before actual machining operations, the CPU 30 executes a preparation process shown in FIGS. 8 (a) and 8 (b) in response to a command inputted by an operator through the data inputting device 33. At first step 200, Fourier transformation is executed on profile data PD stored in the profile data area 312 so that the profile data PD is expanded into a Fourier series in such a manner as given by the following expression PDE;

$$PD = \sum_{n=0}^{\infty} a_{2n}\cos(2n\theta + \phi_{2n}) \quad \text{(PDE)}$$

The Fourier coefficient $a_{2n}$ and the initial phase $\phi_{2n}$ of the expression above are found out by the Fourier transformation, and the result thereof is stored in the memory area 313a of the buffer area 313, as shown in FIG. 10.

In the present embodiment, the expansion is made to $n=6$, and components for $n=0$ to $n=2$ are assigned to the linear motor 131 while components for $n=3$ to $n=6$ are assigned to the piezoelectric actuator 115. Namely, low frequency command profile data CPDL for the linear motor 131 and high frequency command profile data CPDH are calculated using following low frequency command data expression CDEL and high frequency command data expression CDEH, respectively.

$$CPDL(\theta) = a_0 + a_2\cos(2\theta + \phi_2) + a_4\cos(4\theta + \phi_4) \quad \text{(CDEL)}$$

$$CPDH(\theta) = a_6\cos(6\theta + \phi_6) + a_8\cos(8\theta + \phi_8) \\ + a_{10}\cos(10\theta + \phi_{10}) + a_{12}\cos(12\theta + \phi_{12}) \quad \text{(CDEH)}$$

Figure 6:
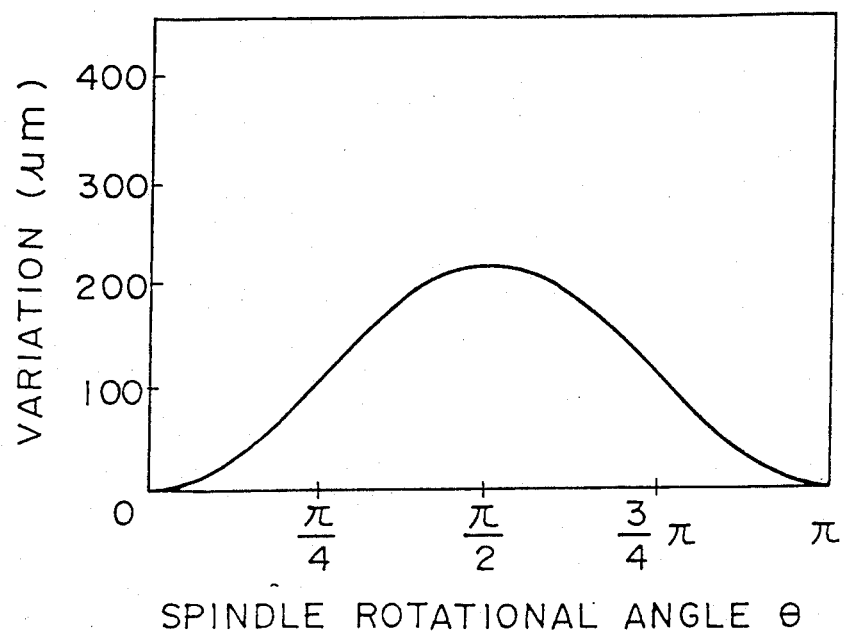
FIG. 6 is an explanatory chart showing low frequency components of profile data.
Figure 7:
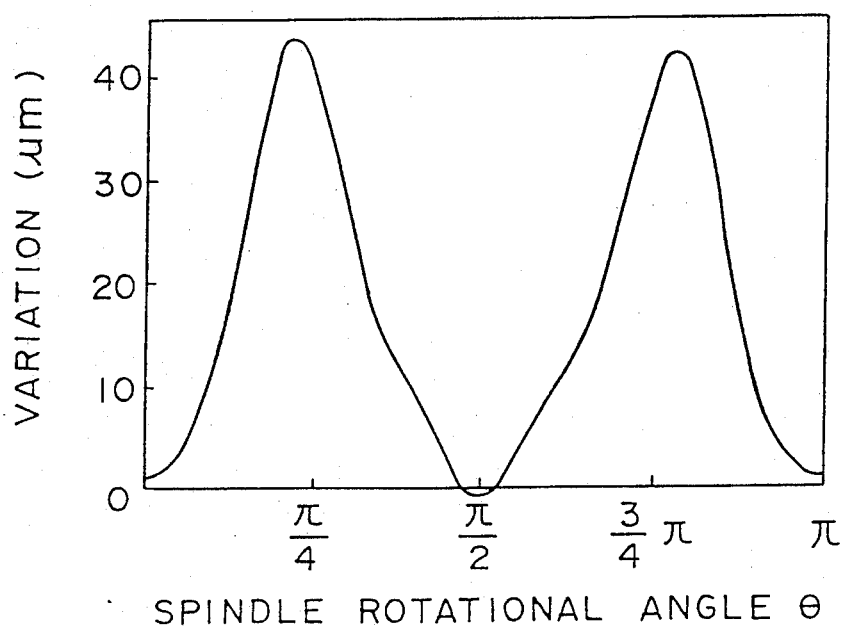
FIG. 7 is an explanatory chart showing high frequency components of the profile data.

These expressions CDEL and CDEH are stored in the memory areas 313b and 313c of the buffer memory 313, respectively. Low frequency command profile data CPDL obtained using the expression CDEL present such a variation as shown in FIG. 6. High frequency command profile data CPDH obtained using the expression CDEH present such a variation as shown in FIG. 7.

The CPU 30 calculates the low frequency command profile data CPDL using the expression CEDL, at step 202, so that the calculated low frequency command profile data CPDL is stored in the memory area 313k. Thereafter, the CPU 30 transfers, at step 204, the low frequency command profile data CPDL from the memory area 313k to the profile data memory 42 of the linear motor driving circuit 40, and then commands the memory controller 41 to sequentially read out the low frequency command profile data CPDL from the profile data memory 42, at step 206. As a result, contents of the low frequency command profile data CPDL are sequentially supplied to the full adder 43, so that the rum 13, i.e. the tool T is moved back and forth in accordance with the low frequency command profile data CPDL. Thereafter, the CPU 30 commands the memory controller 56, at step 208 to memorize the output of the counter 46 in a synchronized relationship with rotation of the spindle 17. As a result, the output of the counter 46 is repeatedly sampled so that the sampled count values are sequentially memorized in the response value memory 55 as low frequency a response value RVL1, which presents an actual position change of the rum 131. At step 210, the CPU 30 executes Fourier transformation on the response value RVL1 to obtain a low frequency response value expression RVEL1 as follows. The expression RVEL1 is memorized in the memory area 313d.

$$RVL(\theta) = b_0 + b_2\cos(2\theta + \alpha_2) + b_4\cos(4\theta + \alpha_4) \quad \text{(RVEL1)}$$

The CPU 30 thereafter compares the above expression RVEL1 with the low frequency commend data expression CDEL at step 212 to calculate the difference therebetween. Namely, the coefficients $b_0$, $b_2$, $b_4$ and the phases $\alpha_2$, $\alpha_4$ are compared with the coefficients $a_0$, $a_2$, $a_4$ and the phases $\phi_2$, $\phi_4$ of the expression CDEL to obtain the coefficient errors $e_0$, $e_2$ and $e_4$ and phase errors $p_2$ and $p_4$. At step 214, the CPU 30 judges whether or not the coefficient errors and the phase errors are within predetermined limit values. If one of the errors exceeds the corresponding limit value, the processing of the CPU 30 moves to step 216 to modify the expression CDEL by adding the coefficients errors $e_0$, $e_2$ and $e_4$ and phase errors $p_2$ and $p_4$ to the coefficients $a_0$, $a_2$, $a_4$ and the phases $\phi_2$, $\phi_4$ of the expression CDEL, respectively. At step 218, the CPU 30 calculates new low frequency command profile data CPDL' using the modified expression CDEL'. The compensated low frequency command profile data CPDL' is stored in the memory area 313k. The CPU 30 thereafter moves back to step 204 to repeat the processing at steps 204 through 212. As a result, the compensated low frequency command profile data CPDL' is transferred to the profile data memory 42 so that the linear motor 131 is driven in accordance with the compensated command profile data CPDL'. Thereafter, new response value data RVL1 is detected to ascertain the difference between the expression CDEL and the expression RVEL1 becomes within the limit. When all the difference become within the respective limits, the rum 113 is finally moved in accordance with the original low frequency command profile data CPDL defining a desired movement of the rum 113.

If all the difference become within the respective limits, the processing of the CPU 30 moves to step 220.

By processing at steps 220 through 240, the high frequency command profile data CPDH are compensated for a positioning error due to reaction force generated by the piezoelectric actuator 115.

At step 220, the CPU 30 calculates the high frequency command profile data CPDH using the expression CPEH so that the command profile data CPDH is stored in the memory area 3131 of the buffer area 313. The CPU 30 thereafter transfers the command profile data CPDH to the profile data memory 62 of the piezoelectric actuator driving circuit 60, at step 222. Then, the CPU 30 commands, at step 224, the memory controllers 41 and 61 to sequentially read out the low frequency command profile data CPDL and high frequency command profile data CPDH from the profile data memory 42 and 62, respectively. As a result, the low frequency command profile data CPDL are sequentially supplied to the full adder 43 while the high frequency command profile data CPDH are sequentially supplied to the D/A converter 63, so that the tool T is moved back and forth in accordance with both of the low frequency command profile data CPDL and the high frequency command profile data CPDH.

During this movement, the piezoelectric actuator 115 produces a reaction force, which is transmitted to the linear motor 113 as disturbance, thereby producing positioning error.

Thereafter, the CPU 30 commands, at step 226, the memory controllers 56 and 68, to memorize the output of the counter 46 and the output of the A/D converter 69, respectively, in a synchronized relationship with rotation of the spindle 17. As a result, the output of the counter 46 is sequentially memorized in the response value memory 55 as a low frequency response value RVL2 indicating an actual position change of the rum 131, while the output of the A/D converter 69 is sequentially memorized in the response value memory 67 as a high frequency response value RVH2 indicating an actual position of the tool T. Since the linear motor 131 is affected by reaction force produced by the piezoelectric actuator, the low frequency response value RVL2 differs from the low frequency response value RVL1 obtained at step 208 at which the piezoelectric actuator 115 is not driven.

At step 228, the CPU 30 executes Fourier transformations on the response values RVL2 and RVH2 memorized in the response value memories 55 and 67, respectively to obtain a low frequency response value expression RVEL2 and a high frequency response expression RVEH2.

$$RVL2(\tau) = c_0 + c_2\cos(2\theta + \beta_2) + c_4\cos(4\theta + \beta_4)$$
$$c_6\cos(6\theta + \beta_6) + c_8\cos(8\theta + \beta_8)$$
$$+ c_{10}\cos(10\theta + \beta_{10}) + c_{12}\cos(12\theta + \beta_{12}) \quad \text{(RVEL2)}$$

$$RVH2(\theta) = d_0 + d_2\cos(2\theta + \delta_2) + d_4\cos(4\theta + \delta_4)$$
$$+ d_6\cos(6\theta + \delta_6) + d_8\cos(8\theta + \delta_8)$$
$$+ d_{10}\cos(10\theta + \delta_{10}) + d_{12}\cos(12\theta + \delta_{12}) \quad \text{(RVEH2)}$$

At step 230, the CPU 30 compares the low frequency response expression RVEL2 with the low frequency response expression RVEL1 obtained at step 210 and stored in the memory area 313d to obtain the difference therebetween as a positioning error due to the reaction force produced by the piezoelectric actuator 115. Namely, the CPU 31 calculates coefficient differences $e_0$ through $e_{12}$ and phase differences $p_2$ through $p_{12}$ between the expressions RVEL2 and RVEL1 as coefficient errors and phase errors.

The CPU 31 thereafter adds the coefficient errors and phase errors to the high frequency command data expression CPEH stored in the memory area 313C to obtain compensated high frequency command data expression CPEH', at step 232. The compensated expression CPEH' is stored in the memory area 313i. At next step 234, the CPU 30 compares the above compensated expression CPEH' with the high frequency response expression RVEH2, at step 234 to calculate the difference therebetween. Namely, the coefficients and the phases of the expression RVEH2 are compared with the coefficients and the phases of the expression CDEH'. At step 236, the CPU 30 judges whether or not the differences of the coefficients and the phases are within predetermined limit values. If any one of the differences exceeds the corresponding limit value, the processing of the CPU 30 moves to step 238 to modify the compensated expression CDEH' by adding the differences of the coefficients and the phases calculated at step 234 to the coefficients and the phases of the expression CDEH', respectively. At step 240, the CPU 30 calculates new high frequency command profile data CPDH' using the modified expression CDEH', and then stores the compensated low frequency command profile data CPDH' in the memory area 3131. The command profile data CPDH' is compensated for the positioning error due to reaction force produced by the piezoelectric actuator 115. After this operation, the processing of the CPU 30 moves back to step 222 for repeating the processing at steps 222 through 234. With this operation, the processing at steps 222 through 234 is repeated until the difference between the compensated high frequency command data expression CDEH' and the high frequency response expression RVEH2 becomes with in the limit. When the difference between them becomes within the limit, the tool T is moved within a tolerance in accordance with the compensated high frequency command profile data CPDH'.

Figure 9:
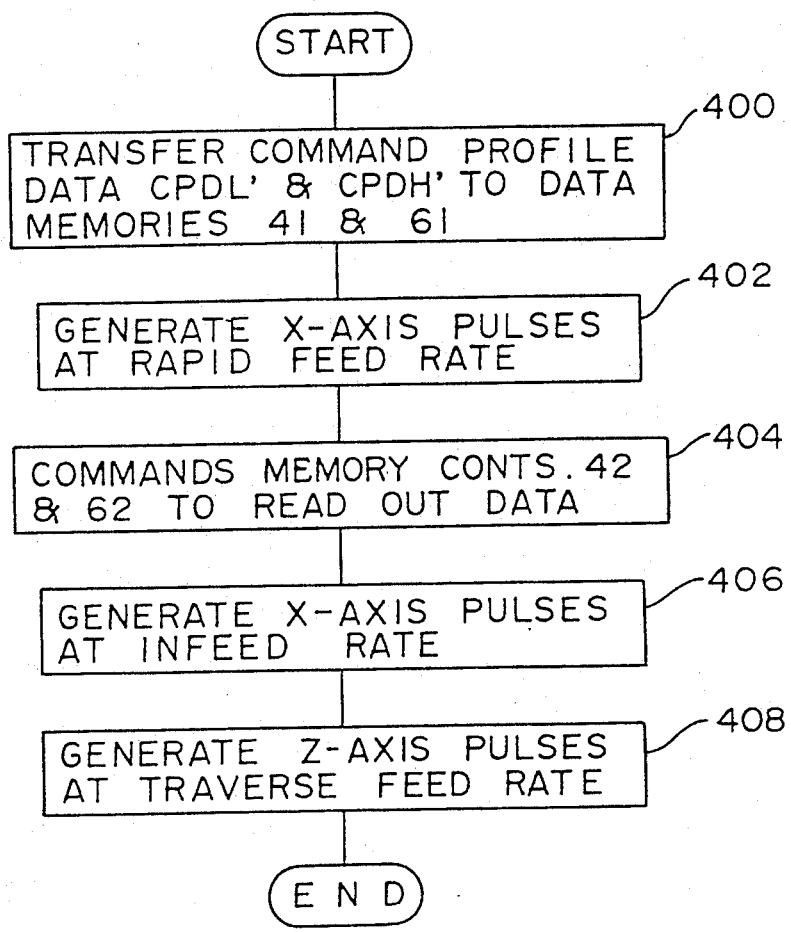

After above-mentioned preparation, the operator commands the CPU 30 to start a machining operation. Since the detailed operation for the machining operation is explained in aforementioned US application, the detailed processing of the CPU 30 during machining operation is omitted in this application. The general processing is shown in FIG. 9. At step 400, the CPU 30 transfers the compensated low frequency command profile data CPDL' and compensated high frequency command profile data CPDH' to the profile data memories 41 and 61, respectively, at step 400. Then, at step 402, CPU 30 commands the pulse generator 51 to generate pulses at a rate corresponding to the programmed rapid feed rate until the tool T reaches at a predetermined cutting infeed start position. Thereafter, the CPU 30 commands the memory controllers 42 and 62 to read out the command profile data CPDL' and CPDH', at step 404. As a result, the linear motor 131 and the piezoelectric actuator 115 are simultaneously driven in a synchronous relationship with rotation of the spindle 17, thereby causing the tool to make a profile generating movement. Since the high frequency command profile data CPDH have been compensated for a error due to reaction force produced by the piezoelectric actuator 115, the tool T is accurately moved back and forth to make a desired profile generating movement.

At step 406, the CPU 30 commands the pulse generator 31 to generate infeed puses at a rate corresponding to a programmed infeed rate until predetermined number of pulses are generated so that the tool T is advanced at the programmed infeed rate. This infeed movement is also achieved by the linear motor 131, and mixed with the profile generating movement. Therefore, the tool T is gradually advanced during the profile generating movement. After the completion of the infeed movement, the CPU 30 distributes command pulses to the Z-axis motor driving circuit 36, at step 408, to move the tool T in the Z-axis direction so that the entire area of the outer surface of the workpiece W is machined.

FIG. 11 shows a first modification of the compensation processing shown in FIG. 8 (b). In the processing shown in FIG. 11, only the processing at step 230' differs from that of the processing of FIG. 8 (b). Namely, the low frequency response value expression RVEL2 is compared with the low frequency command data expression CDEL to obtain an error due to reaction force. Since the command data expression CDEL indicate a theoretical positional change of the rum 113, the error due to reaction force can be calculated based upon the difference between the low frequency response value expression RVEL2 and the low frequency command data expression CDEL FIG. 12 shows another modification of the compensation processing shown in FIG. 8 (b). In the processing shown in FIG. 12, only the piezoelectric actuator 115 is moved for detecting an error due to reaction force. Namely, at step 224', the piezoelectric actuator 115 is activated without activating the linear motor 131, and the movement of the linear motor 131 is detected at step 226'. During this operation, the linear motor 131 is moved by reaction force produced by the piezoelectric actuator 115. This detected movement of the linear motor 131 is used to compensate the high frequency command data expression CDEH.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of machining a non-circular workpiece with a machine tool having a rotatable spindle supporting a workpiece, a movable member guided on a base for movement in a moving direction perpendicular to the rotational axis of said spindle, a tool supported at a front end of said movable member for movement in the moving direction, a low speed actuator for moving said movable member in the moving direction with respect to said base, a high speed actuator for moving said tool in the moving direction with respect to said movable member, first command means for generating low frequency command data which indicate low frequency components of profile data defining position change of said tool with respect to angular position change of said spindle, first drive means for driving said low speed actuator in accordance with said low frequency command data, second command means for generating high frequency command data which indicate high frequency components of said profile data, and second drive means for driving said high speed actuator in accordance with said high frequency command data, said method comprising steps of:

detecting a positioning error of said tool which is produced due to reaction force produced by said high speed actuator;

compensating said high frequency command data based on the positioning error detected by said detecting step; and activating said first and second drive means for machining said workpiece using said low frequency command data and said compensated high frequency command data.

2. A method of machining a non-circular workpiece according to claim 1, wherein said positioning error detecting step comprises steps of:

activating only said first drive means;

detecting a first position change of said movable member when said first drive means is activated;

activating both of said first and second drive means;

detecting a second position change of said movable member when both of said first and second drive means are activated; and calculating a difference between said first position change and second position change as a position error due to reaction force produced by said high speed actuator.

3. A method of machining a non-circular workpiece according to claim 1, wherein said positioning error detecting step comprises steps of:

activating both of said first and second drive means;

detecting a position change of said movable member when both of said first and second drive means are activated; and calculating a difference between the position change detected by said detecting step and said low frequency command data generated by said first command means as a position error due to reaction force produced by said high speed actuator.

4. A method of machining a non-circular workpiece according to claim 1, wherein said positioning error detecting step comprises steps of:

activating only said second drive means;

detecting a position change of said movable member when only said second drive means is activated; and calculating a position error due to reaction force generated by said high speed actuator based on said position change of said movable member detected by said detecting step.

5. An apparatus for machining a non-circular workpiece wherein a spindle supporting a workpiece is rotated at a predetermined speed while a tool is moved back and forth in a moving direction perpendicular to the rotational axis of the spindle in accordance with profile data defining position change of said tool with respect to angular position change of said spindle, comprising:

a movable member being guided on a base for movement in the moving direction, said tool is supported at a front end of said movable member for movement in the moving direction;

a low speed actuator disposed between said base and said movable member for moving said movable member in the moving direction with respect to said base;

a high speed actuator disposed between said movable member and said tool for moving said tool in the moving direction with respect to said movable member;

first command means for generating low frequency command data which indicate low frequency components of said profile data;

first drive means for driving said low speed actuator in accordance with said low frequency command data;

second command means for generating high frequency command data which indicate high frequency components of said profile data;

second drive means for driving said high speed actuator in accordance with said high frequency command data;

error detection means for detecting a positioning error of said tool which is produced due to reaction force produced by said high speed actuator; and compensation means for compensating said high frequency command data based on the positioning error detected by said position error detection means.

6. An apparatus for machining a non-circular workpiece according to claim 5, wherein said low speed actuator is composed of a linear motor, and said high speed actuator is composed of a piezoelectric actuator.

7. An apparatus for machining a non-circular workpiece according to claim 6, wherein said position error detection means comprises:

first drive control means for activating only said first drive means;

first position change detection means for detecting a first position change of said movable member when said first drive means is activated by said first drive control means;

second drive control means for activating both of said first and second drive means;

second position change detection means for detecting a second position change of said movable member when said first and second drive means are activated by said second drive control means; and calculation means for calculating a difference between said first position change and second position change as a positioning error due to reaction force produced by said high speed actuator.

8. An apparatus for machining a non-circular workpiece according to claim 6, wherein said position error detection means comprises:

drive control means for activating both of said first and second drive means;

position change detection means for detecting a position change of said movable member when said first and second drive means are activated by said second drive control means; and calculation means for calculating a difference between said position change detected by said detection means and said low frequency command data generated by said first command means as a positioning error due to reaction force produced by said high speed actuator.

9. An apparatus for machining a non-circular workpiece according to claim 6, wherein said position error determination means comprises:

drive control means for activating only said second drive means;

position change detection means for detecting a position change of said movable member when said second drive means is activate by said second drive control means; and calculation means for calculating a positioning error due to reaction force produced by said high speed actuator based on said position change of said movable member detected by said position change detection means.

* * * * *